United States Patent [19]

Juncker

[11] Patent Number: 4,757,864
[45] Date of Patent: Jul. 19, 1988

[54] HORSESHOE WITH REPLACEABLE SOLE

[75] Inventor: Knud H. Juncker, Oxford, England

[73] Assignee: Hildur Juncker nee Persson, Virum, Denmark

[21] Appl. No.: 936,407

[22] PCT Filed: Mar. 21, 1986

[86] PCT No.: PCT/DK86/00025
§ 371 Date: Nov. 19, 1986
§ 102(e) Date: Nov. 19, 1986

[87] PCT Pub. No.: WO86/05655
PCT Pub. Date: Oct. 9, 1986

[30] Foreign Application Priority Data

Mar. 25, 1985 [DK] Denmark ............... 1340/85

[51] Int. Cl.$^4$ ............................................. A01L 1/04
[52] U.S. Cl. ................................................ 168/11
[58] Field of Search .................... 168/12, 13, 11, 26, 168/4, 23

[56] References Cited

U.S. PATENT DOCUMENTS

| | | | |
|---|---|---|---|
| 599,958 | 3/1898 | Dietrich | 168/11 |
| 601,038 | 3/1898 | Gravis | 168/13 |
| 644,284 | 2/1900 | De Lay | 168/13 |
| 644,329 | 2/1900 | Meisner | 168/14 |
| 749,299 | 1/1904 | Jones | 168/13 |
| 805,410 | 11/1905 | Carey | 168/14 |
| 869,838 | 10/1907 | Green | 168/11 |
| 1,518,372 | 12/1924 | Twiss | 168/13 |

FOREIGN PATENT DOCUMENTS

| | | | |
|---|---|---|---|
| 619157 | 9/1935 | Denmark . | |
| 3128850 | 5/1982 | Denmark . | |
| 56626 | 6/1936 | Norway . | |
| 8303949 | 11/1983 | PCT Int'l Appl. . | |
| 8600194 | 1/1986 | PCT Int'l Appl. . | |
| 430296 | 11/1983 | Sweden . | |
| 13951 | of 1911 | United Kingdom | 168/12 |

Primary Examiner—Robert Peshock
Assistant Examiner—Cary E. Stone
Attorney, Agent, or Firm—Blum Kaplan

[57] ABSTRACT

A horseshoe has an upper part (1) of horseshoe configuration and having a bottom (2) for abutment against the underside of the hoof of a horse. The bottom (2) has walls (3 and 4) along its inner and outer edges. An outsole (75) is removably connectable with the upper part (1). In each of the branches of the bottom (2) a row of nail holes (8,9,10 and 11) is provided. In order to achieve a reliable guiding of the nails (70), a plate portion (25) with an additional row of nail holes (25a,26a,27a and 28a) is provided in the upper part (1) at a distance from the row of nail holes (8,9,10 and 11) in the bottom (2). Each plate portion (24) combines with the bottom (2) to form a box girder in order to provide great twisting stiffness of the horseshoe.

12 Claims, 12 Drawing Sheets

HORSESHOE WITH REPLACEABLE SOLE

The invention relates to a horseshoe comprising an upper part having a bottom intended for abutting the hoof of a horse, said bottom being provided along the major part of its inner and outer edges with upright walls, rows of nail holes being provided in the bottom, and further comprising an outsole, which is removably connectable with the upper part.

A horseshoe of this kind is known from an international patent application, viz. No. PCT/DK83/00053, published on Nov. 24, 1983 under the international publication No. WO 83/03949.

According to this prior art the upper part consists of a channel member of horseshoe configuration. This serves for dirtectly receiving the outsole, its sidewalls being provided with inwardly directed projections adapted to engage a matching protrusion on the outsole. Moreover, the outsole may be held in connection with the said upper part by means of nails which have been driven partly through the nail holes of the upper part so that the nail heads extend into the channel section and can engage with recesses formed in the outsole.

In this known construction, the nails, when being driven in, are solely guided by nail holes in the bottom of the upper part facing the hoof.

The horseshoe according to the present invention is characterized in that the upper part is constructed, at least along the nail hole rows of the bottom, as a box girder, a plate portion with an additional nail hole row being provided at a distance above each of the nail hole rows of the bottom. Hereby the advantage is obtained that the nails, while being driven in, are guided in a reliable manner, viz. both by the nail holes in the bottom and by the nail holes in the plate portion, being located at a distance from the former. Moreover, by virtue of the box girder construction, a great stiffness of the shoe is obtained, at least in the region of the nail holes, and also a great twisting stiffness, whereby it becomes possible to deform the upper part for individual adaptation to the hoof on which the shoe is to be mounted.

In a preferred embodiment of the invention the nail holes of the plate portions may be offset relatively to the holes in the bottom in accordance with the desired driving-in direction of the nails. The fact is that the nails that are driven in closest to the front end of the shoe, should be inclined relatively strongly inwards towards the middle of the hoof, because the front side of the hoof is inclined relatively strongly downwards and forwards relatively to the underside of the hoof. On the contrary, the sides of the hoof extend more steeply relatively to the underside of the hoof, and these different inclinations may thus be taken care of by the offsetting of the nail holes in the plate portions relatively to the corresponding holes in the bottom.

According to the invention, the nail holes in the plate portions may be cut out along three of their sides to form lugs, and these may be bent down towards the bottom and may be secured thereto by welding or soldering, whereby the stiffness of the box girders considered is further increased. A still further means of increasing the stiffness of the box girders consists, according to the invention, in filling these with a moulded plastics material. The solution of the injected plastics material has the function, besides acting as a nail guide, to ensure a firm holding of the nail without sharp edges, so that shock vibrations do not give rise to deformations of the nail.

To ensure a firm holding of the plate portions arranged above the rows of holes of the bottom, said plate portions may, according to the invention, be constructed at the inner sides of their rows of holes with downwardly offset areas which are welded or soldered to the bottom.

A further embodiment of the horseshoe according to the invention is characterized in that the plate portions in which the additional rows of holes are provided are portions of an inner part, which is mounted in an outer part, the bottom of which constitutes the said bottom of the upper part and is provided with upright walls constituting the said upright walls of the upper part, the inner part being constructed, at the front of the shoe, with a bridge portion between which and the bottom of the outer part there is provided a base plate, which is constructed in one piece with a toe clip to form a toe clip mount, said base plate being welded or otherwise secured to the bottom of the outer part and to the bridge portion. Hereby a further increase of the stiffness of the upper part is achieved, particularly in the front portion of the upper part, by virtue of the base plate referred to, and moreover the arrangement of the base plate between the bridge member and the bottom of the outer part provides a firm holding of the toe clip. The plate portion 46 constituting the toe clip may be omitted so that only the base plate is used.

In case a wear plate is secured in the front end of the outsole, the arrangement may advantageously, according to the invention, be such that an anchorage lug is connected with the wear plate and extends at an inclination forwards and upwards therefrom, and that an opening is provided in the base plate of the toe clip mount, said opening having an abutment edge located behind the toe clip and extending at an inclination downwards and rearwards for abutting the anchorage lug upon introduction of the latter into the opening, the underside of the wear plate extending at an inclination downwards and rearwards from the front portion of the shoe in the mounted position of the outsole. Thereby a slope is obtained substantially corresponding to the slope occurring behind the toe clip in a horseshoe forged in one piece.

From the international patent application referred to above it is known, as mentioned, to use the nail heads at least contributorily for holding the outsole in place, viz. by means of recesses receiving the nail heads. Such a holding effect is advantageous also used according to the invention, viz. in an embodiment which is characterized in that the recesses are in the form of undercut grooves extending in the transverse direction of the outsole, and that the nail heads have noses, which in the driven-in position of the nails extend approximately in the same direction as the longitudinal direction of the grooves. Hereby the advantage is obtained that the nail head can be received in the said grooves no matter whether the nail holes are located at a shorter or longer distance from the outer edge of the respective upper part. Thus, the said grooves permit of an individual arrangement of the nail holes, viz. at a shorter or longer distance from the outer edge of the upper part.

In order to achieve a further increase of the stiffness, and more particularly the twisting stiffness of the upper part, the inner part may, according to a further embodiment of the invention, be provided, rearwardly of each box girder in the region of a row of nails, with a channel-shaped portion for forming additional box girders, and these may be closed at their rear ends by means of transverse walls made up from material of the inner part.

Rearwards of said additional box girders, the inner part may, according to the invention, be constructed with cheek plates extending along the inner sides of the side walls of the outer part and being secured to the said side walls, said cheek plates being constructed at their mutually facing sides and along their lower edges with longitudinal ribs for engagement with lateral grooves in blocks of the outsole when these blocks are received between the cheek plates. This embodiment contributes to the firm holding of the outsole, and a great stiffness is achieved by virtue of the fastening of the cheek plates to the side walls of the outer portion.

A still further increase of the stiffness of the upper part is achieved in a further embodiment which is characterized in that rearwardly of each pair of cheek plates an additional box section is provided consisting of the rear end of the outer part and a bottom portion of the inner part, each of said sections being closed at its front by a transverse wall made up from the material of the inner part and being welded or soldered to the bottom of the outer part.

The invention will now be further explained with reference to the drawing, in which FIGS. 27-37 show, on an enlarged scale, sections along the lines 27—27, 28—28, 29—29, 30—30, 31—31, 32—32, 33—33, 34—34, 35—35, 36—36 and 37—37, respectively, in FIG. 26, FIG. 40 is a top view of a wear plate with an anchorage member for an outsole for mounting on the upper part shown, FIG. 41 is a section along the line 41—41 in FIG. 40.

Figures 1, 3, 5:
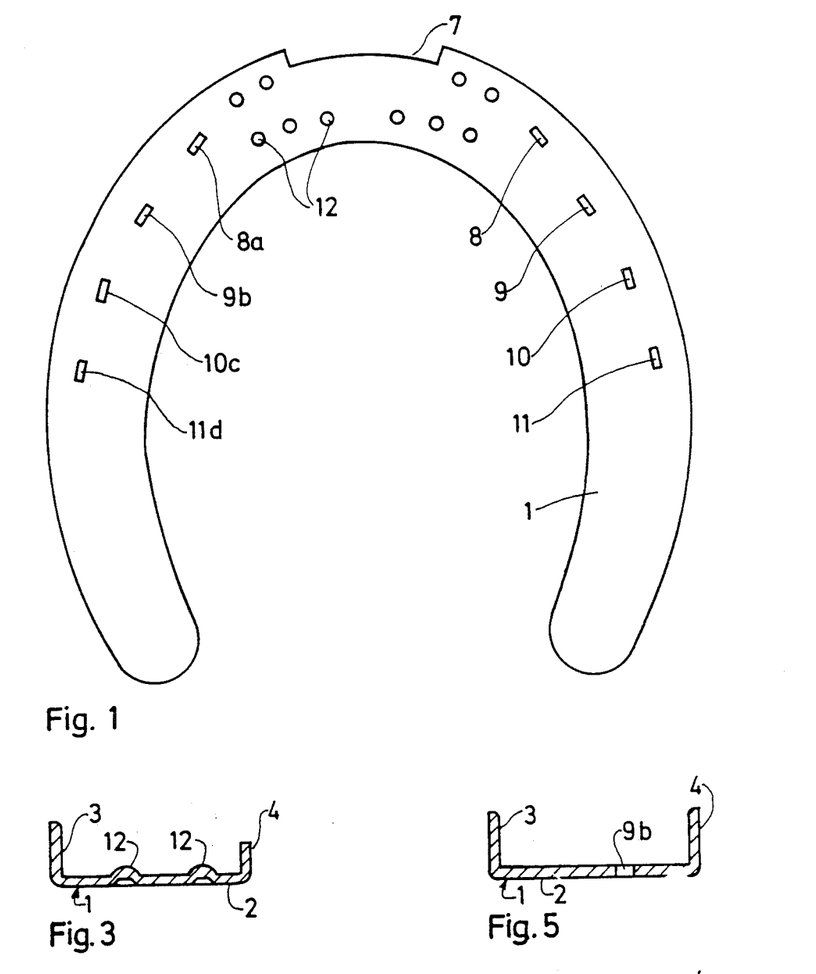
FIGS. 1 and 2 are a top view and a bottom view, respectively, of an outer part of an upper part of a horseshoe according to an embodiment of the invention.
FIGS. 3-6 show, on a larger scale, sections along the lines 3—3; 4—4; 5—5 and 6—6, respectively, in FIG. 2.

In the drawing, 1 is an outer part of an upper part of an embodiment of the horseshoe according to the invention. This is shown in FIG. 1 as seen from above, i.e. the side which in the mounted position of the horseshoe faces the hoof. This outer part has a bottom 2 and an inner wall 3 along its inner edge and an outer wall 4 along its outer edge, said walls being connected with each other by means of rounded end walls 5 and 6, FIG. 2, at the rear end of the shoe. These walls are substantially perpendicular to the bottom 2 and are constructed in one piece with the latter such as is apparent from the sections in FIGS. 3-6. However, the outer wall is interrupted at the front of the shoe, where a stepped recess 7 is formed, which, as will be explained later, serves to receive a toe clip mount. In the bottom 2 four nail holes are punched out, viz. 8, 9, 10 and 11 in one side and 8a, 9b, 10c and 11d in the other side. In the bottom there are provided pressed-up welding bosses 12, 12 for the welding connection of the previously mentioned toe clip mount.

Figure 4:
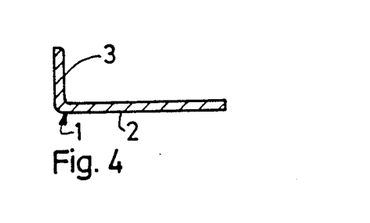
Figure 6:
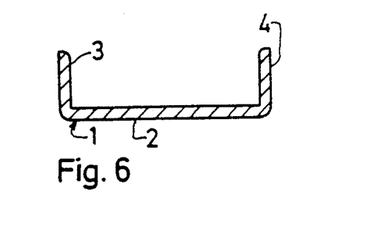
Figure 7:
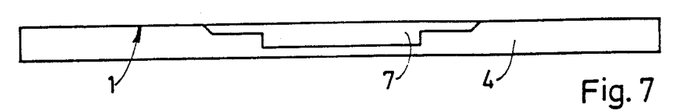
FIG. 7 is a view in the direction of the arrows 7—7 in FIG. 2.

As is apparent from the sections in FIGS. 3, 4, 5 and 6, the outer part considered thus forms a channel-shaped structure, which however in the region of the recess 7 lacks a portion of the outer wall 4 and an edge portion of the bottom, such as is apparent from FIG. 4.

Figure 8:
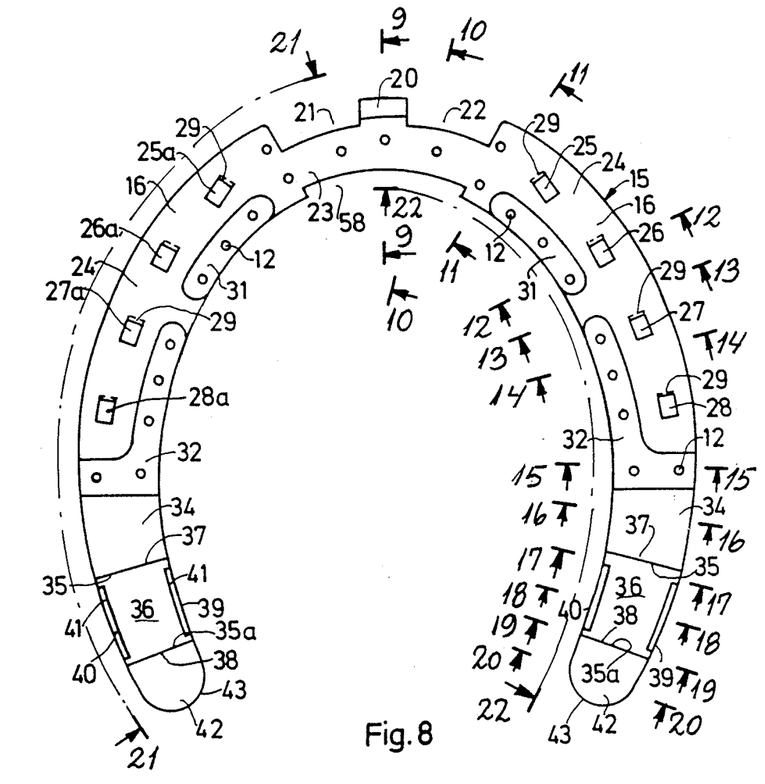
FIG. 8 is a bottom view of an inner part associated with the outer part shown in FIGS. 1-7, FIGS. 9-20 show, on an enlarged scale, sections along the lines 9—9, 10—10, 11—11, 12—12, 13—13, 14—14, 15—15, 16—16, 17—17, 18—18, 19—19 and 20—20, respectively, in FIG. 8, FIGS. 21 and 22 are views in the direction of the arrows 21—21 and 22—22, respectively, in FIG. 8, FIGS. 23-25,25A show a toe clip mount for the horseshoe, as seen in front view, top view, rear view and in section along the line 25A—25A in FIG. 23, respectively.

FIG. 8 is a bottom view of an inner part belonging to the outer part shown in FIGS. 1-7. The inner part 15 consists, like the outer part 1, of steel and has an outer and inner circumferential configuration such that it can be received in the space formed in the outer part by means of the side walls 3 and 4 of the latter.

Figure 9:
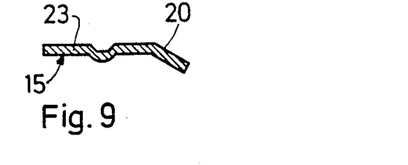
Figure 10:
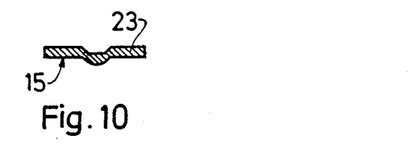
Figure 11:
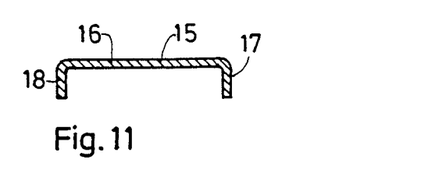

The inner part has a bottom 16, which in FIG. 8 is turned upwards, but in the mounted position of the shoe is turned downwards. The bottom is constructed with an outer wall 17 which, however, is interrupted at certain places, such as will be explained in further detail in the following, and an inner wall 18, so that the inner part, too, at least along certain portions of its circumference has a U-shaped cross section, where the edges of the walls 17 and 18 extend upwards in the mounted position of the inner part. Starting at the front end of the inner part, this has a guiding lug 20, which in FIG. 8 is bent downwards at an inclination, such as is apparent from FIG. 9, but which in the mounted position extends at an inclination upwards and forwards, said guiding lug 20 serving to facilitate the interlocking with the outer part 1.

At either side of the guiding lug 20 a recess 21 and 22, respectively, is provided in the front edge of the inner part so that the lug 20 is free. The guiding lug 20 extends from a bridge portion 23 with welding bosses 12 for connection with the previously mentioned toe clip mount. In the mounted position of the inner part, this bridge portion 23 has a distance from the bottom 2 of the outer part 1 such that part of the toe clip mount can be received between the bridge portion 23 and the bottom 1 and can be welded to these by means of the welding bosses 12.

Proceeding in the clockwise direction, the bridge portion 23 is followed by a plate portion or a nail section 24 with four nail holes 25, 26, 27 and 28. These are cut along three of their edges, viz. along their two side edges and their rear edge, so that a lug 29 is formed along the front edge of each nail hole. As is apparent from FIG. 12, these lugs 29 are bent downwards in the drawing (upwards in the mounted position), and their length corresponds to the distance of the bottom 16 of the inner part 15 from the bottom 2 of the outer part 1 in the mounted position of the inner part. The free end edge of each lug 29 has a welding boss 12. It will thus be understood that in the said position the two bottoms 2 and 16 have a distance from each other corresponding to the length of the lugs 29 and the height of the walls 17 and 18. In the portion of the inner part representing the other branch of the shoe, a corresponding row of holes 25a, 26a, 27a and 28a is provided.

Figures 12, 13:
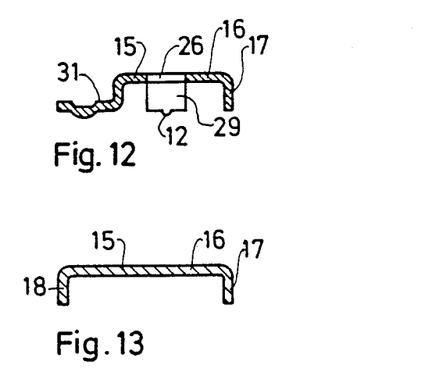
Figure 14:
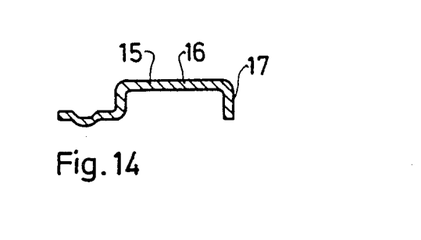
Figure 15:
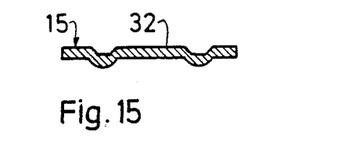

In the region of the nail section 24, two downwardly offset areas 31 and 32 are provided along the inner edge of the inner part in FIG. 8, such as is apparent from FIGS. 12, 14 and 15, the last named area 32 being L-shaped with the leg of the L extending to the outer side of the inner part, as shown in FIG. 15. These offset areas are also provided with welding bosses, viz. for connection with the bottom 2 of the outer part within the offset areas.

Figure 16:
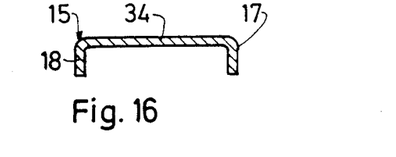

After the nail section 24 follows a channel-shaped section 34 having the cross section shown in FIG. 16, where the side walls 17 and 18 have a height corresponding to the distance between the bottoms 2 and 16 in the mounted position, and where the distance between the outer sides of the walls 17 and 18 corresponds to the distance between the inner sides of the side walls 3 and 4 of the outer part.

Figure 21:
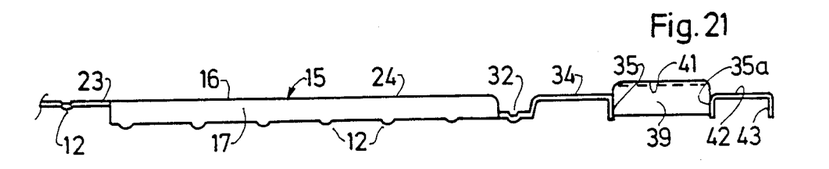
Figure 22:
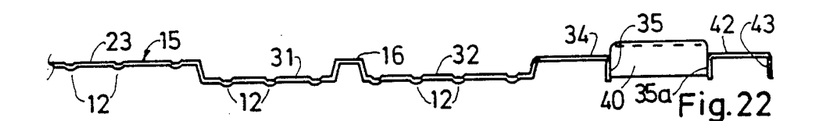

In the next following section 36, the bottom 16 is deformed, the bottom material in this section being used for forming narrow side portions, which are bent upwards so as to extend flush with the side walls 17 and 18, as is apparent from FIGS. 21 and 22, to form cheek plates 39 and 40. These cheek plates 39 and 40 are constructed along their edges facing downwards in the mounted position of the inner part, with mutually facing, longitudinal projections 41, 41, FIGS. 18, 21 and 22, of wedge-shaped cross section. Other portions of the bottom material, viz. those adjacent the end confines of this section 36, are bent downwards along bending lines 37 and 38 and are cut so as to form partitions 35,35a, FIG. 17, and FIGS. 21 and 22, which at their lower edges are provided with welding bosses 12, FIG. 17.

The inner part is terminated at its rear end by a bottom portion 42, which is flush with the remaining portions of the bottom 16, and along the rear edge of the bottom portion 42 the two sides walls 17 and 18 are connected with each other by means of an arcuate end wall 43, FIGS. 21 and 22.

The previously mentioned toe clip mount is shown in FIGS. 23–25,25A and consists of a base plate 45, which at its front edge has an upwardly bent triangle 46 to form the toe clip of the shoe. The toe clip is delimited at its root end by two vertical side edges 48 and 49, and the distance between the latter corresponds to the width of the recess 7 at the front end of the outer part, FIG. 2. Laterally of the side edges 48 and 49, the front edge of the base plate is delimited by two arcuate edge portions 50 and 51, and the rear edge 52 of the base plate is concave and has a distance from the edge portions 50 and 51 corresponding to the distance between the inner sides of the side walls 3 and 4 of the outer part.

Figure 2:
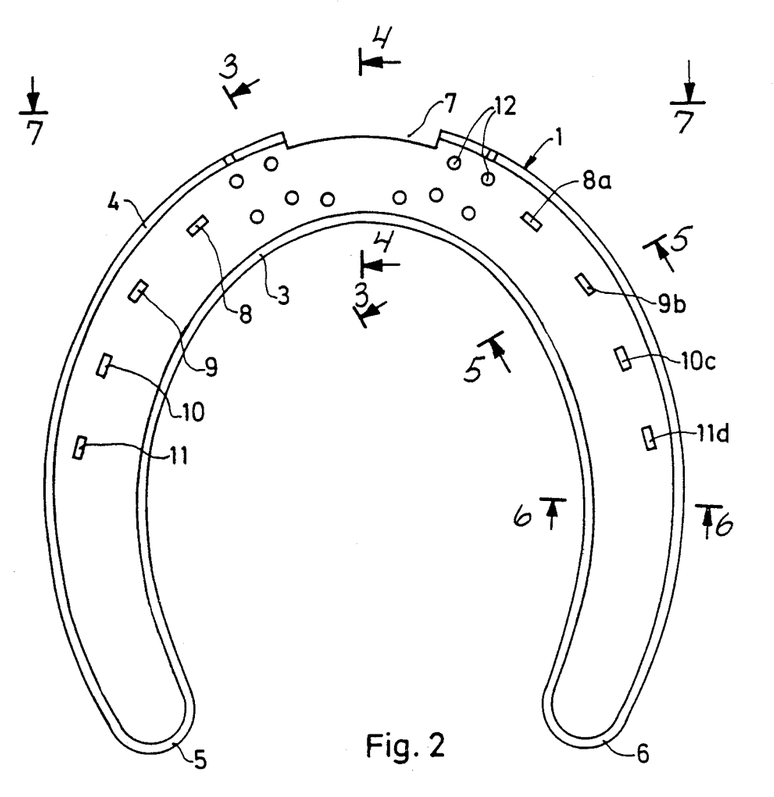

It will thus be understood that the toe clip mount can be placed with the base plate 45 in abutment against the inner side of the bottom 2 of the outer part and with the toe clip extending downwards in FIG. 2 and can be received in the recess 7 without protruding from the outer part, whereby injury to the horse is avoided if it should kick itself. Thereafter the base plate can be welded to the bottom. The toe clip 46 is rearwardly directed, as shown in FIG. 25A, and thus facilitates the beating of the toe clip against the hoof by the blacksmith in the shoeing process.

Rearwardly of the toe clip 46, the base plate 45 has a rectangular opening 54, the front edge 55 of which is inclined downwards and rearwards as shown in FIG. 25A. When the toe clip mount has been placed in the manner described, the inner part 15 is placed in the outer part, the lug 20 being introduced into the opening 54, whereafter the whole of the inner part can be introduced into the outer part with the outer sides of the side walls 17 and 18 facing and approximately contacting the inner sides of the walls 3 and 4. In this operation the end portions of the outer wall 17 of the inner part adjacent the recesses 21 and 22 will engage in spaces formed between end edge recesses 57,57 in the front edge of the base plate and the inner sides of the end portions of the outer wall 4 of the outer part adjacent the recess 7. Moreover, the end portions of the inner wall 18 of the inner part 15 adjacent the ends of a recess 58 along the inner side of the front portion of the inner part (FIG. 8) will engage in spaces formed between end edge recesses 59,59 in the rear edge of the base plate 45 and the inner side of the inner wall 3 of the outer part. Now, the inner part 15 is firmly held in the outer part and can be connected with this by welding by means of the welding bosses 12 in the offset areas 31 and 32, and by means of the welding bosses 12 at the ends of the lugs 29, FIG. 12. Moreover, the bridge portion 23 of the inner part can be welded to the base plate 45 of the toe clip mount by means of its welding bosses 12 and the welding bosses, shown in FIG. 8, provided at the ends of the nail sections adjacent the bridge portion 23.

Figure 17:
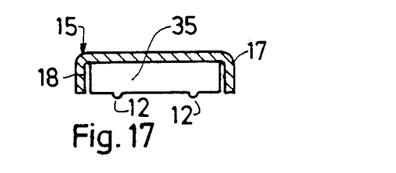
Figures 18, 19:
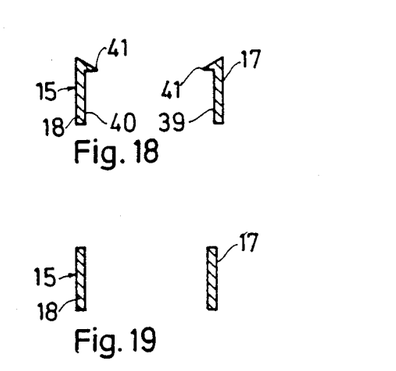
Figure 20:
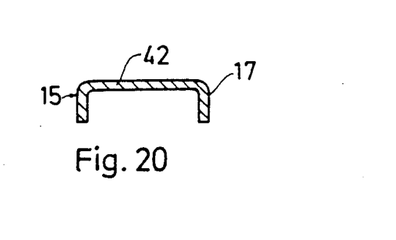
Figure 35:
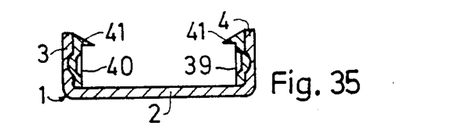
Figure 36:
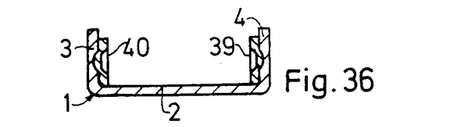
Figure 37:
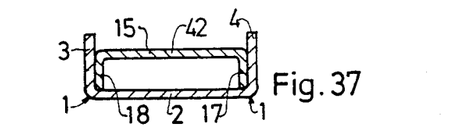
Figure 38:
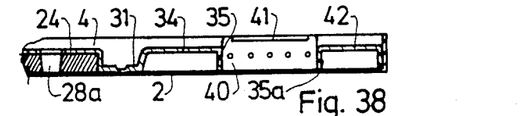
FIG. 38 shows a section along the line 38—38 in FIG. 26.
Figure 39:
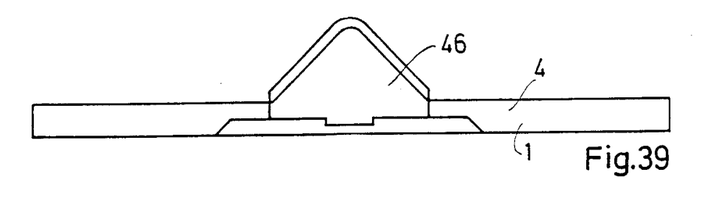
FIG. 39 is a view in the direction of the arrows 39—39 in FIG. 26.

The parts now assume the state illustrated in FIGS. 26–38, from which it will be seen (FIGS. 35 and 36) that also the cheek plates 39 and 40 are dot-welded to the side walls 3 and 4 of the outer part, cf. also FIG. 38. Moreover, the welding bosses 12 of the transverse walls 35 and 35a, FIG. 17, 20 and 21, are welded to the bottom 2 of the outer part.

Figure 27:
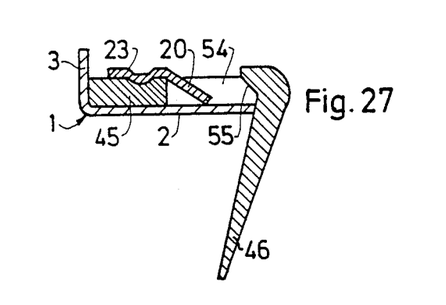

From FIG. 27 it is likewise apparent how the lug 20 engages the opening 54 of the toe clip mount, and in this figure the previously explained welding-together of the bridge portion 23 and the base plate 45 is shown.

Figure 28:
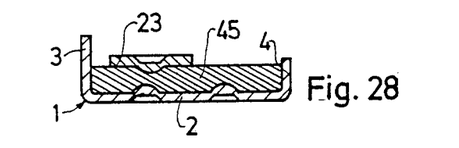
Figure 29:
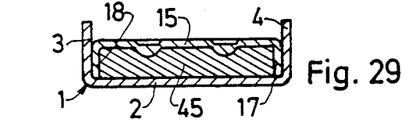

FIG. 28 shows the welding-together of the bridge portion 23 and the base plate 45 and also the welding of the latter to the bottom 2 of the outer part. FIG. 29 illustrates the previously explained engagement of one of the end portions of the inner wall 18 of the inner part 15 between the inner wall 3 of the outer part and one of the end edge recesses 57 of the base plate 45, as well as the engagement of one of the ends of the outer wall 17 of the inner part between the outer wall 4 of the outer part and one of the end edge recesses 57 of the base plate. It will thus be understood that the front portion of the upper part is well stiffened by virtue of the base plate, and this is at the same time firmly held relatively to the outer and inner parts so that, as a further consequence, the angle of the toe clip 46 relatively to the bottom 2 of the outer part, which as previously mentioned faces the hoof in the mounted position of the upper part, will not be changed, even by strong impacts from the hoof, cf. also FIG. 65.

Figure 26:
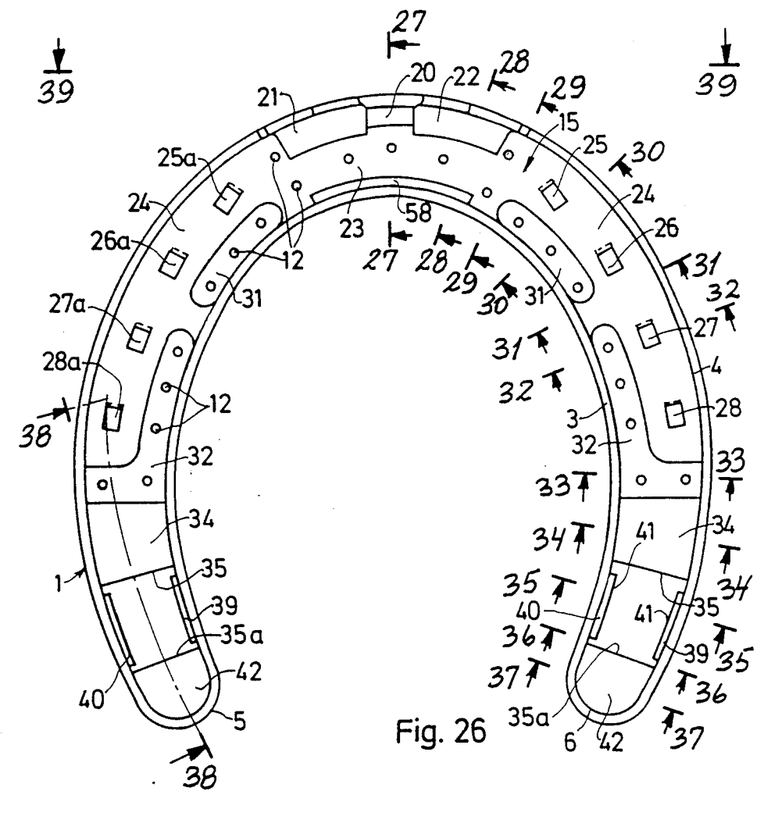
FIG. 26 is a bottom view of the outer part of FIGS. 1-7, after the toe clip mount of FIGS. 23-25A and the inner part of FIGS. 8-22 have been mounted therein to from the upper part of the shown embodiment of the horseshoe.
Figures 30, 31, 32, 33, 55:
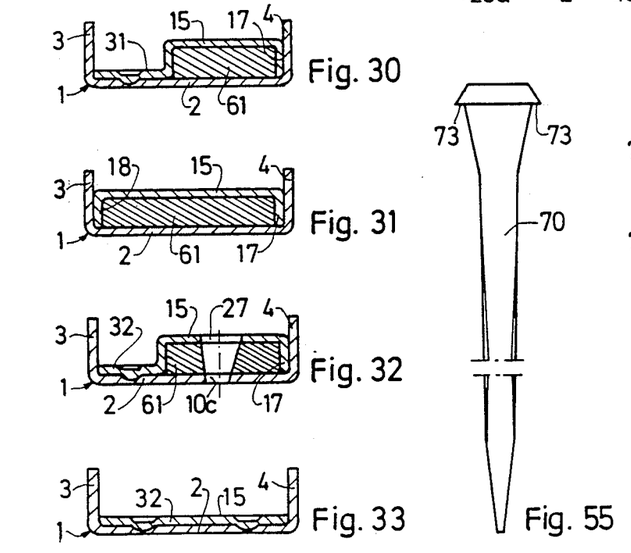

Proceeding in the clockwise direction in FIG. 26, the rearward end of the base plate 45 of the toe clip mount is followed by a box girder or box girder-like section, which is formed by the bottom 2 of the outer part and by the plate portion or nail section 15, with the exception of the offset areas 31 and 32, cf. FIGS. 30, 31 and 32, said section being filled with a suitable moulded plastics material 61. After the rear portion of the offset area 32, cf. FIG. 33, which forms a rear closure of the cavity of the nail section, follows another box girder or box girder section 34, FIG. 34, the rear end of which is additionally reinforced by means of the transverse wall 35, FIG. 17. Then follows the section with the cheek plates 39 and 40, which is likewise stiff due to the welding of the cheek plates to the side walls 3 and 4 of the outer part and the transverse wall 35a rearwardly of said section. At the rear end the upper part is terminated by an additional box girder or box girder section, viz. corresponding to the bottom portion 42 of the inner part, cf. FIG. 37.

This particular stiffening by means of box girder sections has the effect that the upper part becomes stiff, but its rounded shape can nevertheless be adapted to the shape of the hoof of the individual horse without the upper side of the upper part (corresponding to the outer side of the bottom 2 of the outer part 1) loosing its plane shape. At the same time the height of the upper part can be kept low and light which is of great importance to the tread and pace of the horse.

Figure 64:
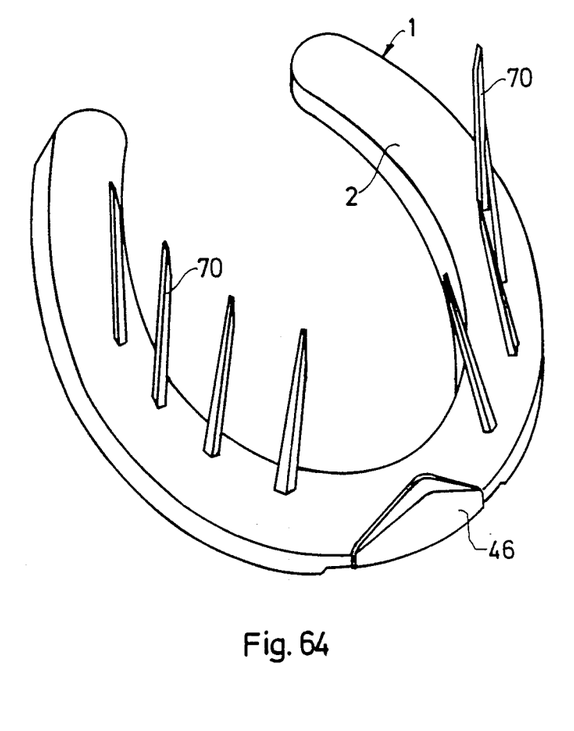
FIG. 64 is a view illustrating the horseshoe and the positioning and angle of inclination of the horseshoe nails.

The outer part and the inner part also provide special advantages in respect of the guiding of the horseshoe nails and the angle, at which these are driven into the hoof. The shape of the hoof varies from horse to horse, and for each horse the shoes for all four hoofs should be individually adapted. Moreover, it should be observed that for the left fore and hind shoe, the left row of nails, as seen from the upper side of the shoe, should extend relatively closely to the inner edge of the shoe, while the right row of nail holes should extend relatively closely to the outer edge of the shoe. On the contrary, for the right fore and hind shoe, it should be observed that the left row of holes should extend closely to the outer edge of the shoe, while the right row of holes should extend closely to the inner edge of the shoe. There are of course exceptions from this general rule. A further condition to be observed is that a nail, which is driven in through the frontmost hole of a row of nails (the front hole) should be driven in at a relatively great inclination relatively to the upper side of the shoe and in a direction towards the interior of the hoof, owing to the fact that the front side of the hoof, is inclined forwardly and downwardly towards the underside of the hoof, while the sides of the hoof are more or less perpendicular to the underside of the hoof. These angles are illustrated in FIG. 64 and in FIGS. 59-63. In the last named figures, a front hole 65 is shown, the middle axis of which is inclined at about 14° relatively to the upper side of the shoe, which is denoted by 66 in this figure. For the next to foremost hole 67, the stipulation is that its middle axis is inclined at about 10°, for the next following hole 68, the angle is 5°, and for the rearmost hole 69 it is 0°.

Figure 58:
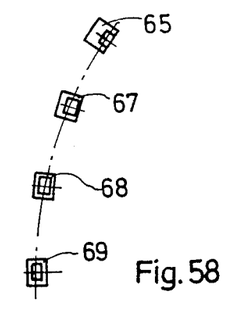
FIG. 58 shows a row of nails in bottom view.
Figure 59:
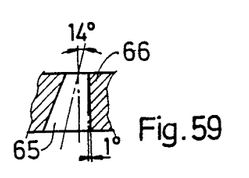
FIGS. 59-62 are enlarged views for illustrating different nail holes.
Figure 60:
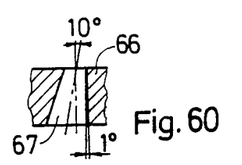
Figure 61:
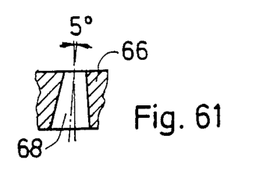
Figure 62:
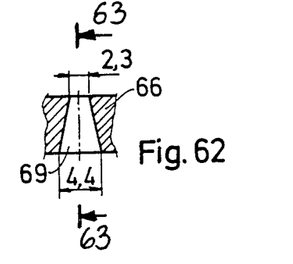
Figure 63:
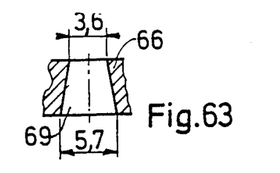
FIG. 63 is a section along the line 63—63 in FIG. 61.

In the row of nail holes shown in FIG. 58, the holes are numbered in the same manner as in FIGS. 59-62, and the large rectangles mark the input ends of the holes, while the small rectangles mark the output ends of the holes. The large rectangles in FIG. 58 represent the nail holes 25, 26, 27 and 28 in the inner part, FIG. 8, while the small rectangles in FIG. 58 represent the nail holes 8a, 9b, 10c and 11d in the outer part, FIG. 2. It will be immediately understood that due to the design of the outer part and the inner part the said nail angles can be adapted to needs, viz. by arranging the holes of the two rows of nail holes in accordance with the desired nail angles. Since moreover the two rows of nail holes in each half of the shoe are located at a distance from each other, cf. the holes 27 and 10c in FIG. 32, a reliable guiding of the nails during driving-in is achieved.

Figure 56:
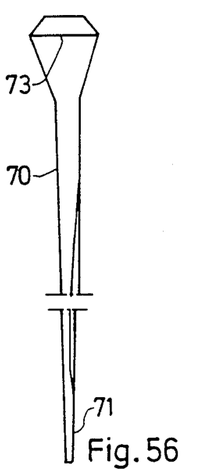
Figures 57, 65:
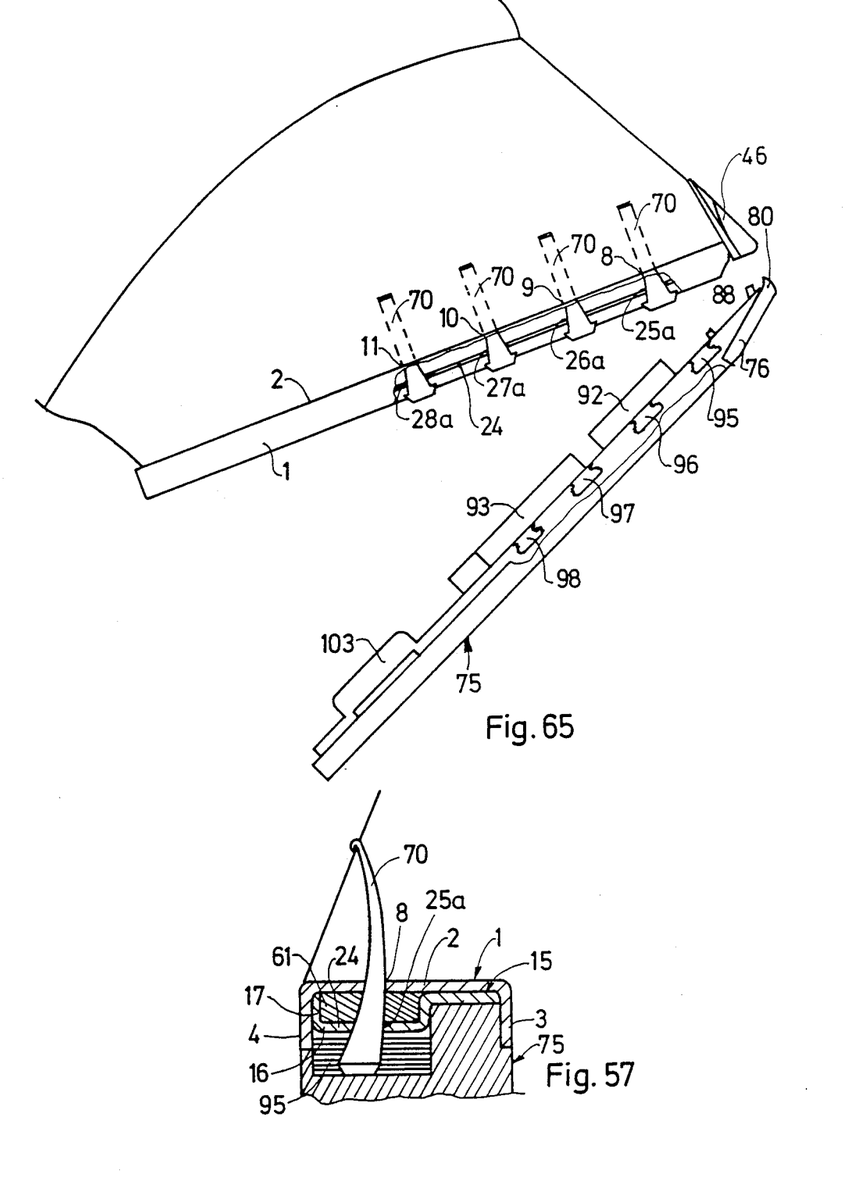
FIG. 57 shows, on an enlarged scale, a fragmentary section through the horseshoe, as fastened to a hoof, for illustrating the position of a nail.
FIG. 65 is a view illustrating the manner of mounting of the outsole.

FIGS. 55 and 56 show a nail 70 for use in fastening the upper part. This nail has in known manner a chamfer 71 on one side of its tip in order to make the nail curve during driving-in, as illustrated in FIG. 57.

As is apparent from FIGS. 55 and 56, the head of the nail is designed in a particular manner, being provided along the short sides of the head with two noses 73,73 extending towards the tip of the nail. This particular design of the head has been chosen for the releasable holding of the outsole shown in FIG. 42, the nails being driven in through the holes, in the shoeing process, only to such an extent that part of the shaft of the nail and the head of the nail protrude freely, as shown in FIGS. 57 and 65.

Figures 23, 24, 40, 41:
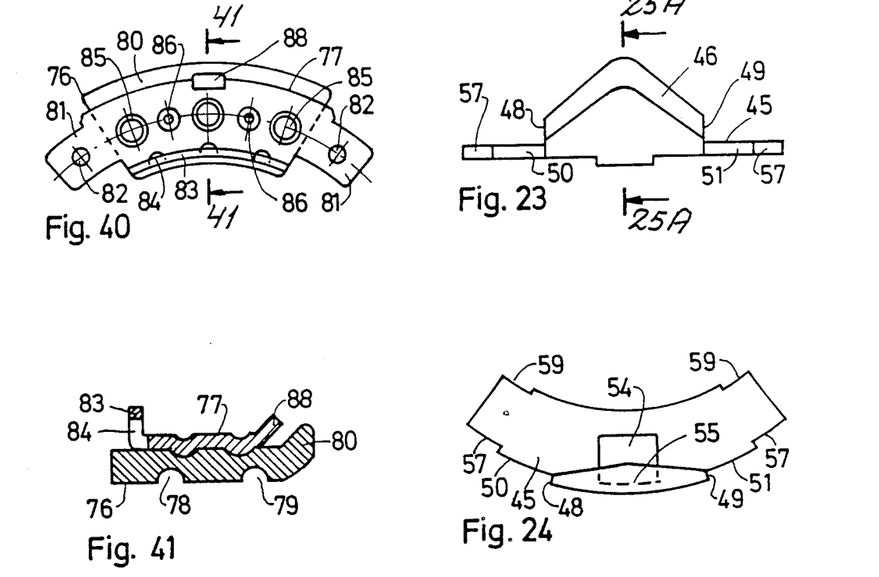
Figure 25:
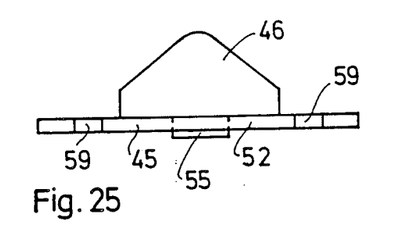

The outsole is generally denoted by 75 and is made from tough wear-resistant plastics material. However, in the outsole there is embedded a wear plate 76 with associated anchorage member 77, as shown in FIGS. 40 and 41. The wear plate consists of a wear-resistant metal and has in top view the shape of an annular segment. In the underside of the wear plate, two grooves 78 and 79 are provided, extending approximately in the circumferential direction. Hereby the advantage is obtained that the friction against the ground is reduced, if the horse in taking off makes a twist of the foot. If the foot were stuck in the circumferential direction, such a twist could result in a heavy load on the legs of the horse.

The arcuate front portion 80 of the wear plate is upwardly inclined in order to provide a suitable rounding. The anchorage member 77 consists of a metal plate and has a somewhat smaller width than the wear plate and a somewhat greater length than the latter and thus has two extending end portions 81,81 each having a hole 82. The rear edge 83 of the anchorage member is bent upwards, and at the transition between the rear edge 83 and the main portion of the member holes 84 are provided. The anchorage member is connected to the wear plate by means of three welds 85, and between these the anchorage member has holes 86 with chamfered edges. These, together with the ends 81 and the holes 82 and 84, serve for anchoring in the plastics material, of which the outsole consists.

In the middle of its front edge, the anchorage member has an upwardly and forwardly inclined anchorage lug 88, which at the mounting of the sole on the upper part, is put into the hole 54, FIG. 27, in the toe clip mount between the guiding lug 20 of the inner part and in abutment against the inclined abutment surface 55 formed by the front edge of the hole 54, thus immediately behind the root end of the toe clip 46, cf. also FIG. 26. This direct coupling-together of the wear plate 76 and the toe clip mount provides the very low front of the shoe shown in FIG. 65, with upwardly inclined wear plate, cf. also FIGS. 43 and 44, thereby providing a low toe clip corresponding to the rise or rounding normally occurring behind the toe clip of a horseshoe forged in one piece.

Figure 42:
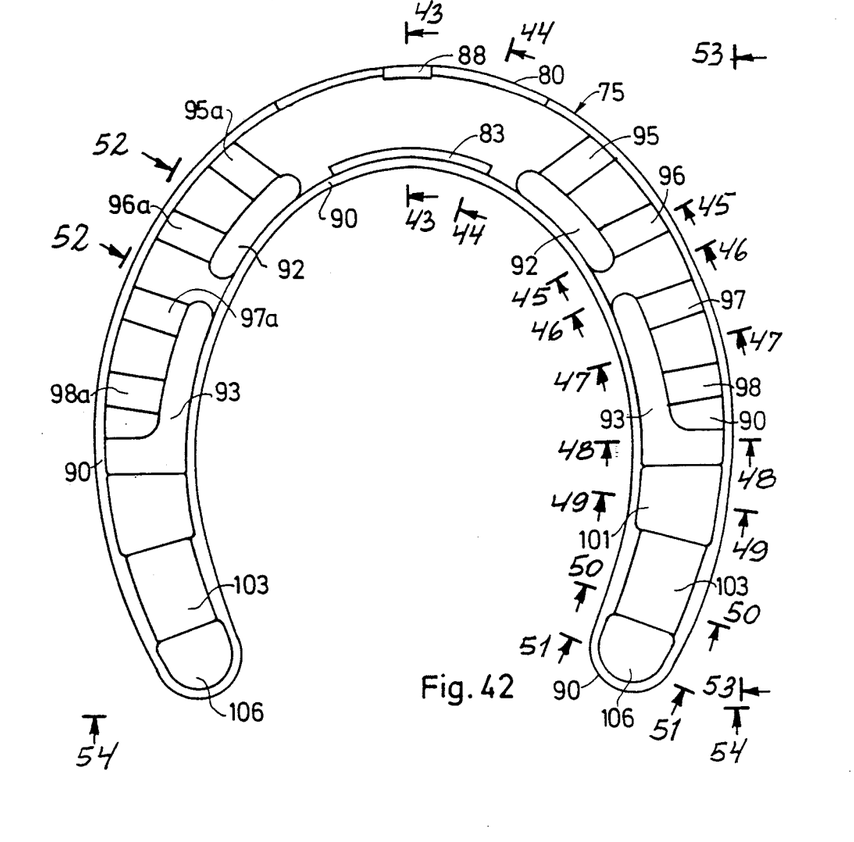
FIG. 42 is a top view of an outsole for mounting on the upper part shown.

The outsole 75, which is viewed from above in FIG. 42, has an upper side, which is substantially complementary to the underside of the assembled upper part.

The underside of the outsole is not shown in detail in the drawing, seeing that it can be designed in a manner known per se in removable outsoles. Thus, the underside can be plane or it can be provided with embedded calks or other objects, depending on the intended use of the sole.

Figure 43:
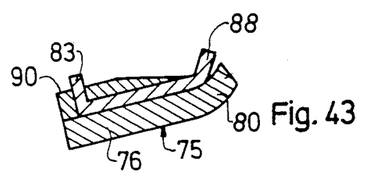
FIGS. 43-51 show, on an enlarged scale, sections along the lines 43—43, 44—44, 45—45, 46—46, 47—47, 48—48, 49—49, 50—50 and 51—51, respectively, in FIG. 42.
Figure 44:
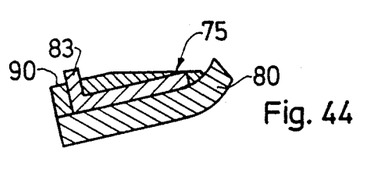

Proceeding from the section 43—43 in FIG. 42, cf. FIG. 43, the anchorage lug 88 of the anchorage member and the front edge of the front portion 80 of the wear plate 76 are illustrated. Also the rear edge of the anchorage member and rearwards of this a recess 90 for receiving the outer edge of the rear wall 3 of the outer portion are illustrated, cf. also FIG. 27.

Figure 45:
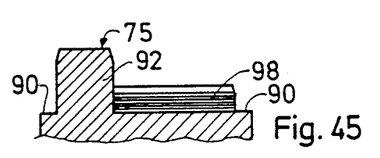
Figure 46:
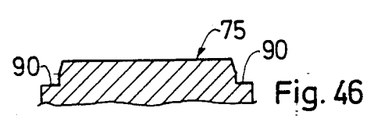
Figure 47:
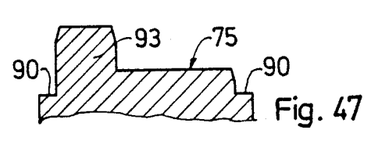
Figure 48:
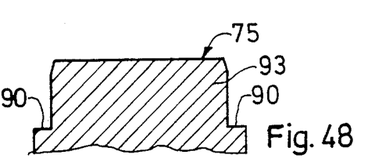
Figure 52:
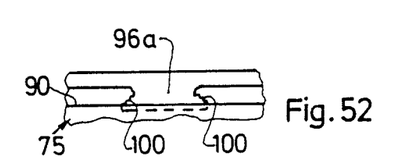
FIG. 52 shows, on an enlarged scale, a fragmentary view in the direction of the arrows 52—52 in FIG. 42, FIGS. 53 and 54 are views in the direction of the arrows 53—53 and 54—54, respectively, in FIG. 42, FIGS. 55 and 56 show, on an enlarged scale, a nail for use in the fastening of the horseshoe, in front view and side view, respectively.
Figure 53:
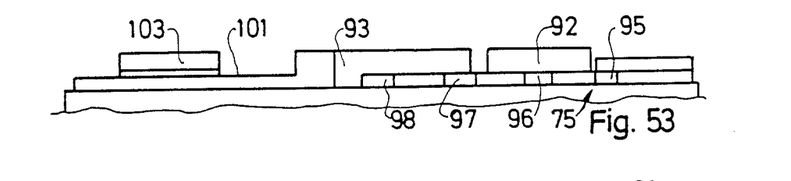
Figure 54:
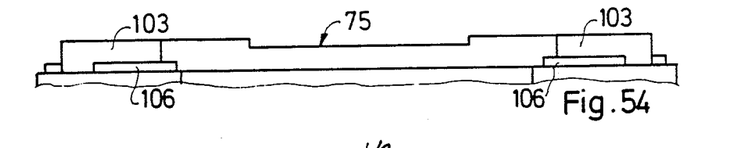

Proceeding in the clockwise direction then follows a section corresponding to the nail section 15, FIG. 26, where protrusions 92 and 93 are illustrated, which correspond to the offset areas 31 and 32, FIG. 26. Outwardly of these, four transverse undercut grooves 95, 96, 97 and 98 with fluted side walls are provided. The corresponding grooves in the opposite branch of the shoe are marked by the reference characters 95a, 96a, 97a and 98a. FIG. 45 shows a longitudinal section through the groove 98, and FIG. 52 shows the cross-sectional shape of the groove 96a. From this figure, it is clearly apparent that the walls 100,100 of the grooves are inclined downwards from the top and away from one another and are constructed with flutes.

In the mounted position of the sole, the grooves 95a, 96a, 97a and 98a are located opposite the corresponding nail holes 25, 26, 27 and 28 of the inner part 15, cf. FIG. 26, and these grooves can therefore receive the heads of the nails driven in through said holes. The nails are driven in with the short sides of their heads, and thereby their noses 73, FIGS. 55 and 56, extending transversely of the longitudinal direction of the respective branch of the shoe. It will therefore be understood that when the sole is applied, which as mentioned is started by introducing the anchorage lug 88 of the anchorage member into the opening 54 of the toe clip mount, the sole can thereafter be brought into engagement with the nail heads by a rolling-in movement, viz. by means of the grooves 95-98, 95a-98a, which during this rolling movement will change from a more open position to a less open position. In the latter position, the walls 100,100 will engage with the noses 73,73 of the nails. Due to the transverse position of the grooves, this engagement will take place no matter whether the nail holes and thereby the nails are located at a smaller or longer distance from the outer edge of the shoe so that the sole can be used independently of the previously explained varying position of the rows of nail holes from shoe to shoe.

Figure 34:
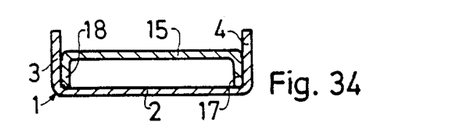
Figure 49:
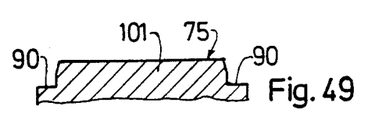

After the transverse portion of the protrusion 93 corresponding to the transverse portion of the offset area 32, FIG. 26, follows a somewhat lower protrusion 101, FIG. 49, viz. corresponding to the U-shaped region 34 of the inner part 15, cf. FIG. 34.

Figure 50:
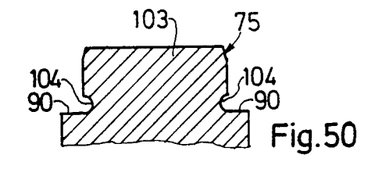

Then follows a relatively high protrusion or block 103, which is provided in its lower portion with a longitudinal groove 104,104, FIG. 50, along each longitudinal side. In the previously explained mounting process, these blocks 103 are pressed in between the cheek plates 39, 40, cf. FIGS. 35 and 36, until the longitudinal projections 41,41 of the cheek plates engage the grooves 104,104 and the upper sides of the blocks 103 rest against the bottom 2 of the outer part.

Figure 51:
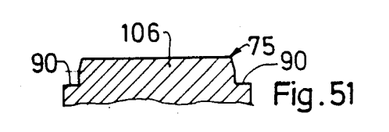

Now, the outsole has been mounted and rests with its rear ends, which are provided with shallow protrusions 106, FIG. 51, against the bottom portion 42 of the inner part, cf. FIG. 37.

The recess 90 previously mentioned in connection with FIG. 43 extends along the whole inner side of the sole, along its rear end and forwards along the outer side of the sole and ends at the lateral delimitations of the outsole 75. In the mounted position of the sole, the portions of the walls 3, 4, 5 and 6 of the outer part extending beyond the inner part 15 engage in this recess 90 so that the sole is also firmly held against displacement in the lateral directions.

Dismounting of a sole, e.g. when it is to be replaced by another sole provided with calks or mordax depending on weather conditions and the terrain, is performed by lifting the rear ends of the sole from the upper part, extracting the blocks 103 from the spaces between the cheek plates 39,40, and continuing this rolling off, whereby the groove walls 100,100 are moved away from one another and release the nail heads. Now the anchorage lug 88 can be extracted rearwardly from the opening 54 of the toe clip mount and the sole is free.

While the connection of the outer part and the inner part has been explained in the beforegoing description as taking place by welding, it will be understood that the connection can also take place otherwise. Thus, the outer part and the inner part may be connected with each other by means of vacuum soldering, i.e. a soldering process taking place by heating and under vacuum, while at the same time the parts to be soldered together are kept pressed against one another or against soldering metal parts, the process being so conducted that the soldering metal melts and is drawn by capillary action in between the parts to be soldered together.

I claim:

1. A horseshoe comprising an upper part having a bottom (2) intended for abutting the hoof of a horse, said bottom being provided along the major part of its inner and outer edges with upright walls (3, 4, 5 and 6), rows of nail holes (8, 9, 10 and 11; 8a, 9b, 10c and 11d) being provided in the bottom, and further comprising an outsold (75), which is removably connectable with the upper part, characterized in that the upper part is constructed, at least along the nail hole rows (8, 9, 10, 11; 8a, 9b, 10c and 11d) of the bottom (2) having box girder portions, plate portions (24) with additional nail hole rows (25-28; 25a-28a) being provided at a distance above each of the nail hole rows (8, 9, 10 and 11; 8a, 9b, 10c and 11d) of the bottom.

2. A horseshoe according to claim 1, characterized in that the nail holes (25-28; 25a-28a) of the plate portions (24) are offset relatively to the holes in the bottom in accordance with the desired driving-in direction of the nails.

3. A horseshoe according to claim 1, characterized in that the nail holes in the plate portions (24) are cut out along three of their sides so as to form lugs, which are bent down towards the bottom (2) and are secured thereto by welding or soldering.

4. A horseshoe according to claim 1, characterized in that the box girders are filled with a moulded plastics material (61).

5. A horseshoe according to claim 1, characterized in that the plate portions (24) arranged above the rows of holes (8,9,10 and 11; 8a,9b,10c and 11d) of the bottom (2) are constructed at the inner side of their rows of holes with downwardly offset areas (31,32) which are welded or soldered to the bottom (2).

6. A horseshoe according to claim 1, characterized in that the plate portions (24), in which the additional rows of holes (25-28, 25a-28a) are provided, are portions of an inner part (15), which is mounted in an outer part (1), the bottom (2) of which constitutes the said bottom of the upper part and is provided with upright walls (3,4,5,6) constituting the said upright walls of the upper part, the inner part being constructed, at the front of the shoe, with a bridge portion (23) between which and the bottom (2) of the outer part (1) there is provided a base plate (45) which is constructed in one piece with a toe clip (46) to form a toe clip mount, said base plate (45) being welded or otherwise secured to the bottom (2) of the outer part and to the bridge portion (23).

7. A horseshoe according to claim 6, characterized in that the toe clip is received at its root end in a recess (7) of the outer wall (4) of the outer part (1) in such a manner that the lower end of the toe clip fills the recess (7) without projections or edges.

8. A horseshoe according to claim 6, in which a wear plate (76) is secured in the front end of the outsole (75), characterized in that an anchorage lug (88) is connected with the wear plate (76) and extends at an inclination forwards and upwards therefrom, and that an opening (54) is provided in the base plate (45) of the toe clip mount, said opening (54) having an abutment edge (55) located behind the toe clip (46) and extending at an inclination downwards and rearwards for abutting the anchorage lug (88) upon introduction of the latter into the opening (54), the underside of the wear plate extending at an inclination downwards and rearwards from the front portion of the shoe in the mounted position of the outsole.

9. A horseshoe according to claim 1, in which the outsole has recesses for receiving the heads of the nails serving to secure the upper part, characterized in that the recesses are in the form of undercut grooves (95-98; 95a-98a) extending in the transverse direction of the outsole, and that the nail heads have noses (73,73), which in the driven-in position of the nails extend approximately in the same direction as the longitudinal direction of the grooves.

10. A horseshoe according to claim 6, characterized in that the inner part (15) is provided, rearwardly of each box girder in the region of the rows of nails, with an additional channel-shaped portion (34) for forming an additional box girder, the additional box girders being closed at their rear ends by means of a transverse wall (35) made up from material of the inner part.

11. A horseshoe according to claim 10, characterized in that, rearwardly of each additional box girder, the inner part is constructed with cheek plates (39,40) extending along the inner sides of the side walls (3 and 4) of the outer part and being secured to the said side walls (3,4), said cheek plates being constructed at their mutually facing sides and along their lower edges with longitudinal ribs (41,41) for engagement with lateral grooves (90,90) in blocks (103) of the outsole when these blocks are received between the cheek plates (39,40).

12. A horseshoe according to claim 11, characterized in that rearwardly of each pair of cheek plates (39,40) an additional box section is provided consisting of the rear end of the outer part and a bottom portion (42) of the inner part, each of said sections being closed at its front by a transverse wall (35a) made up from the material of the inner part and being welded or soldered to the bottom (2) of the outer part.

* * * * *